United States Patent [19]

Thiel, deceased et al.

[11] 4,428,723
[45] Jan. 31, 1984

[54] APPARATUS FOR STRETCHING A CONTINUOUSLY ADVANCING SYNTHETIC-RESIN WEB AND FEEDING SAME STEPWISE TO A THERMOFORMING MACHINE

[76] Inventors: Alfons W. Thiel, deceased, late of Mainz, Fed. Rep. of Germany; by Erika Thiel, heiress, Uferstrasse 15, D-6500 Mainz, Fed. Rep. of Germany

[21] Appl. No.: 349,994

[22] Filed: Feb. 18, 1982

[51] Int. Cl.³ .............................................. B29C 17/02
[52] U.S. Cl. ............................... 425/324.1; 264/210.7; 264/235.8; 264/290.2; 425/400
[58] Field of Search ..................... 425/324.1, 143, 384, 425/400, 399; 264/288.4, 290.2, 289.6, 291, 264/235.6, 235.8, 210.7; 26/72, 73

[56] References Cited

U.S. PATENT DOCUMENTS 4,105,386  8/1978  Thiel et al. ..................... 425/324.1
4,140,457  2/1979  Miki et al. ......................... 425/384
4,288,400  9/1981  Winstead ......................... 264/210.7

FOREIGN PATENT DOCUMENTS 2832385  7/1978  Fed. Rep. of Germany .
50-40428  12/1975  Japan ................................. 425/400

Primary Examiner—Donald E. Czaja
Assistant Examiner—Mary A. Becker
Attorney, Agent, or Firm—Karl F. Ross; Herbert Dubno

[57] ABSTRACT

An apparatus used in combination with an input machine that continuously delivers a stretchable web to an input location and with an output machine that operates stepwise to treat the web at a stationary output location has a reciprocal support frame between the locations and displaceable in an upstream direction toward the upstream location and a downstream direction toward the downstream location. Longitudinal and transverse stretchers are carried on the frame and have web-engaging elements displaceable relative to the frame in the downstream direction for stretching the web and holding the web in stretched condition. A storing or tempering stage between the frame and the upstream location supports a loop of the web so that as the frame moves back and forth this loops grows and diminishes. A drive connected to the stretchers continuously advances the web in the downstream direction relative to the frame at a web-travel rate. An actuator is connected to the frame to move same when moving in the upstream direction substantially at the web-travel rate. Thus the web stops moving at the downstream location during such upstream movement of the frame.

25 Claims, 22 Drawing Figures

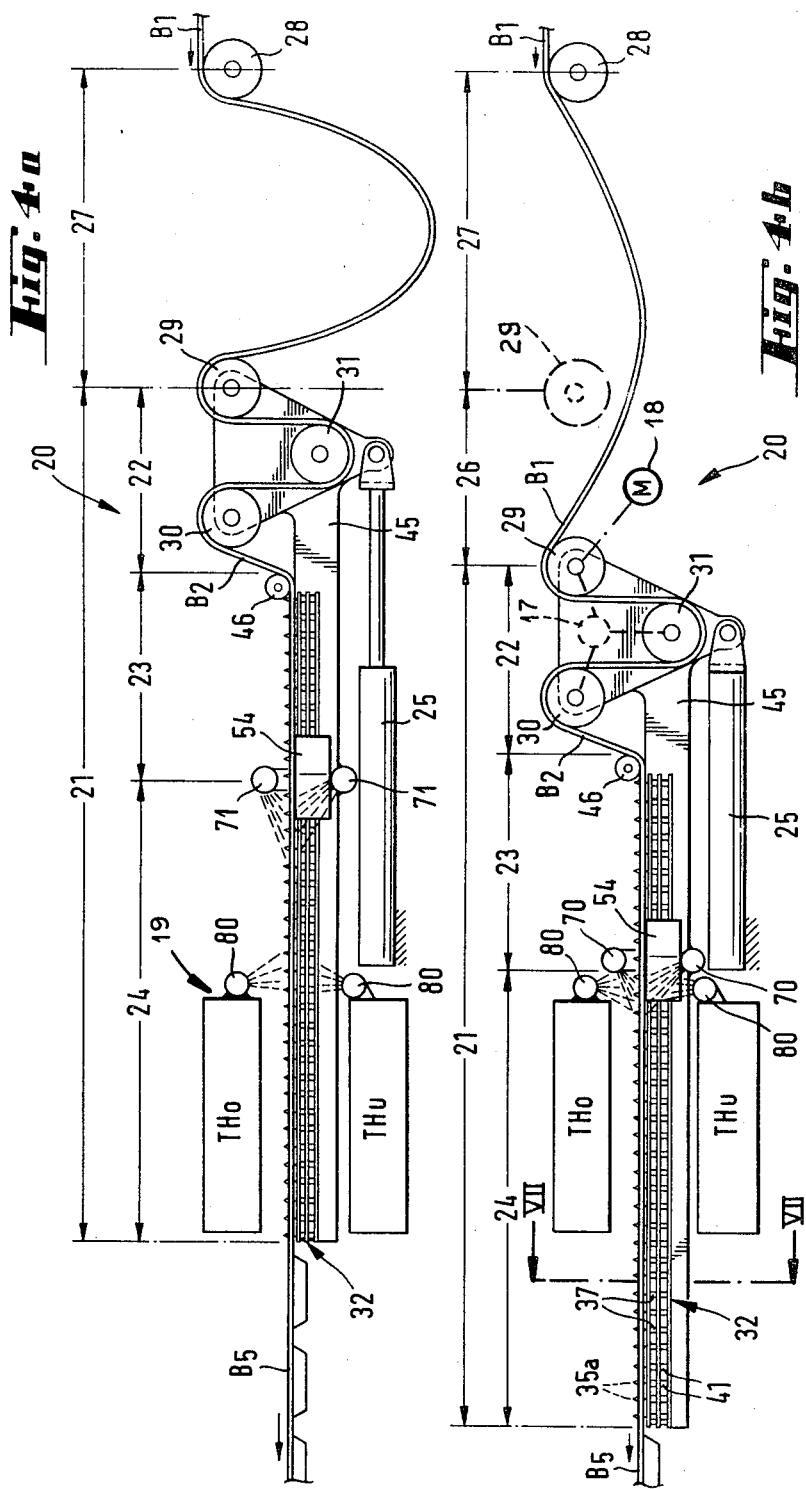

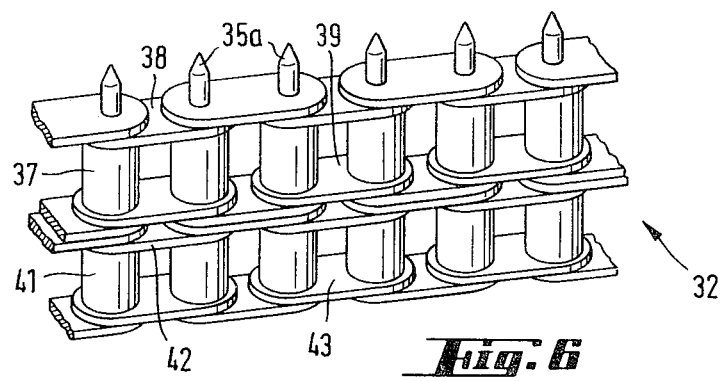
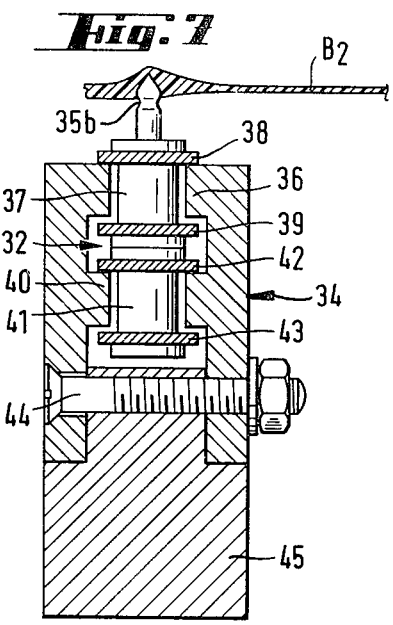
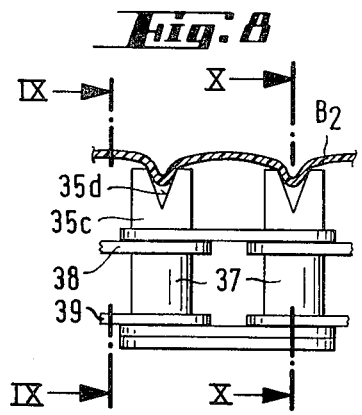
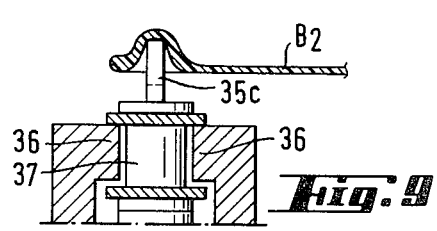
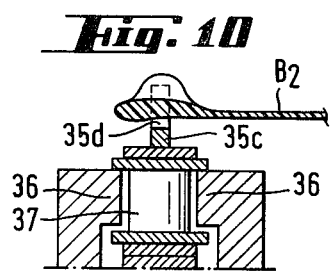

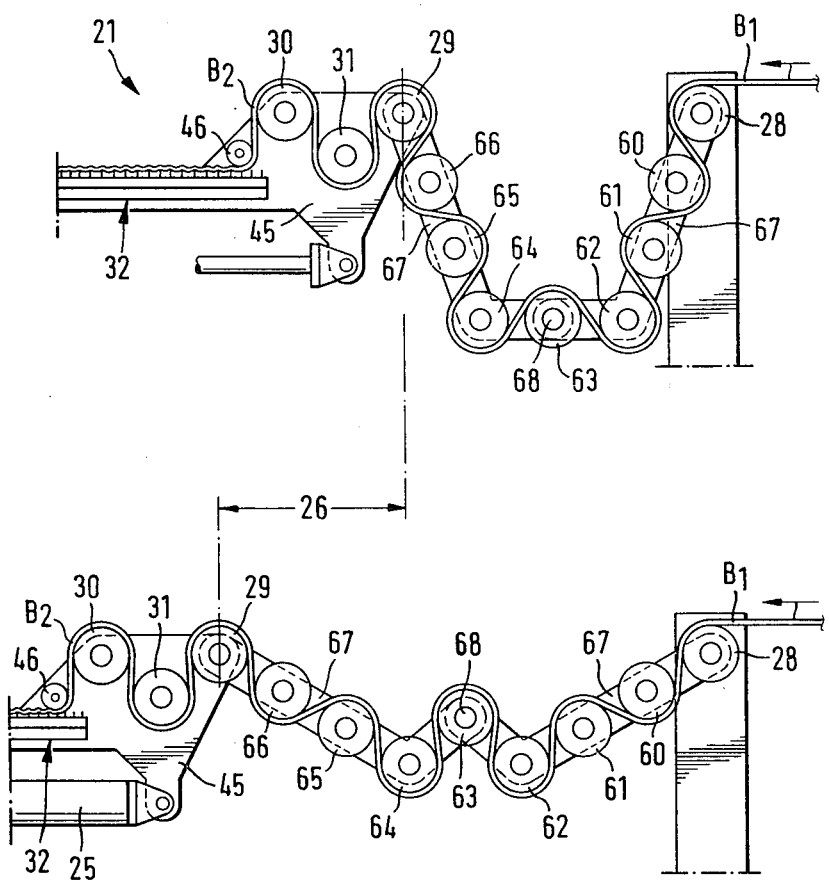

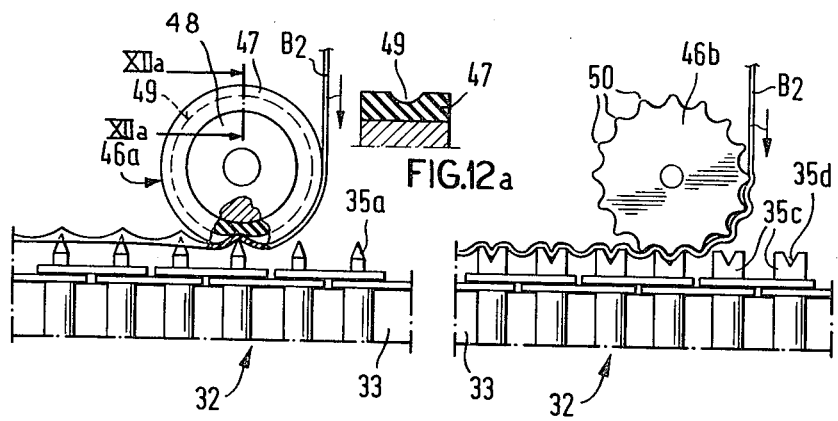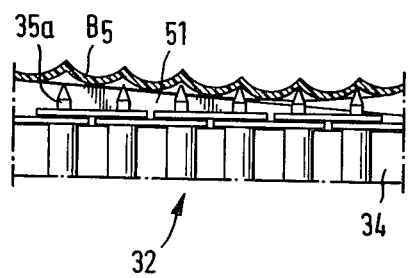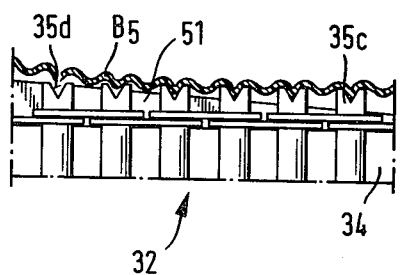

APPARATUS FOR STRETCHING A CONTINUOUSLY ADVANCING SYNTHETIC-RESIN WEB AND FEEDING SAME STEPWISE TO A THERMOFORMING MACHINE

FIELD OF THE INVENTION

The present invention relates to an apparatus used to stretch a web that is continuously delivered to it by an input machine and then feeding this web stepwise to an output machine. More particularly this invention concerns an apparatus for biaxially stretching a thermoplastic web as it is produced by an extruder and then feeding the stretched web in steps to a thermoforming machine.

BACKGROUND OF THE INVENTION

It is known to stretch a synthetic-resin web in its plane either in one direction—so-called uniaxial orientation—or in two transverse directions—so-called biaxial orientation—so as to change important characteristics, such as mechanical strength, of the web. This process is typically done immediately as the web issues from an extruder, while it is still hot, and the stretched web is fed immediately to a thermoforming machine. Since an extruder operates continuously and a thermoformer discontinuously, a speed compensator must be employed so that the web is received continuously but fed out discontinuously.

Such an apparatus is known from German patent document 2,832,385 published in Germany without claim to foreign priority Feb. 14, 1980 based on an application filed July 24, 1978 by A. Thiel. In this apparatus a polystyrene web is first longitudinally stretched between a plurality of rollers, then transversely stretched between a pair of conveyor elements gripped to its longitudinal edges, and finally passed through a speed compensator to the thermoformer. The speed compensator is a roller or the like that is displaceable tranversely of the transport plane of the web so that when it moves away from this plane with a speed equal to half of the transport speed the web stops downstream of it, and, when it moves back toward the plane, the web moves faster downstream than upstream. Such a machine is relatively massive, and the drives of all the various sprockets and wheels and of the speed compensator must all be quite heavily dimensioned and perfectly synchronized to move the web through smoothly. It is normal that the distance between the upstream end of this device, which is formed by the output of the extruder, and the downstream end, which is constituted by the upstream end of the thermoforming mold, is equal to about five mold lengths. The normal travel time through this apparatus is therefore about 10 to 15 seconds.

Study has shown, however, that the molecular orientation or so-called plastic memory that is produced by stretching in a synthetic-resin web, and that so advantageously influences the characteristics of resins like polystyrene, is intimately related to the temperature at which this orientation is set in the resin. Thus the time between when the resin is stretched, which is normally done with the web hot, and the time when the resin cools sufficiently to set the stretch orientation in it is critical. The web relaxes, that is its oriented molecules largely reorient themselves randomly, if the resin stays hot for some time after it is stretched even though the web is held at the enlarged size that was imparted to it during stretching. For example it has been found that polystyrene that is stretched while near its plastification temperature loses approximately half of its orientation within one second.

Thus the above-described prior-art machine is deficient in that it allows an excessive amount of time to elapse after the hot plastics web is stretched. In fact so much time is frequently lost that by the time the stretched resin has reached the thermoformer it is not substantially stronger than it would have been if not stretched.

Attempts to speed up this process, as by discontinuous operation of the stretcher such as described in U.S. Pat. No. 3,172,159, have not worked as such discontinuous operation causes waves or other imperfections in the web.

Another solution is stretching at lower temperatures. Such a procedure is substantially more difficult, however, due to the greater mechanical strength of the web at a lower temperature. In addition it is simply impossible to set the desired molecular orientation in a resin that is not quite hot.

OBJECTS OF THE INVENTION

It is therefore an object of the present invention to provide an improved apparatus of the above-described type.

Another object is the provision of such an apparatus which overcomes the above-given disadvantages.

A further object is to provide such an apparatus which operates so rapidly that the above-described relaxation is largely avoided.

Yet another object is for such an apparatus to be able to adjust the temperature of the resin for most effective orientation.

SUMMARY OF THE INVENTION

These objects are attained according to the instant invention in such an apparatus that is used in combination with an input machine that continuously delivers a stretchable web to an input location and with an output machine that operates stepwise to treat the web at a stationary output location. The stretching apparatus according to this invention has a reciprocal support frame between the locations and displaceable in an upstream direction toward the upstream location and a downstream direction toward the downstream location. Stretch means is carried on the frame and includes web-engaging elements displaceable relative to the frame in the downstream direction for stretching the web and holding the web in stretched condition. Storage means between the frame and the upstream location supports a loop of the web so that as the frame moves back and forth this loop grows and diminishes. Drive means connected to the stretch means continuously advances the web in the downstream direction relative to the frame at a web-travel rate. Displacement means is connected to the frame to move same when moving in the upstream direction substantially at the web-travel rate. Thus the web stops moving at the downstream location during such upstream movement of the frame.

The apparatus according to this invention therefore greatly compresses the path between the upstream and downstream machines, normally the extruder and thermoformer, so that the amount of time that elapses between stretching and thermoforming is greatly reduced. Since the storage loop of the belt is upstream of the stretcher, the web need not pass though it after it is stretched. Making the frame carrying the stretcher reciprocal therefore incorporates the speed compensator in the stretcher for minimal travel path of the web.

In fact according to this invention the frame is displaceable into an extreme downstream position lying at least partially downstream of the downstream location. The drive means completely stops displacement of the web relative to the output machine, even though the stretch and holding means is still moving relative to the frame. During such stoppage the output machine can act on the stationary web section. The output machine has to this end a predetermined length equal generally to the reciprocation stroke of the frame.

According to this invention the stretch means includes chains extending generally in the travel direction of the web between the upstream and downstream locations and flanking the web on the frame. These chains carry at least some of the web-engaging elements and are connected to the drive means.

More particularly, these chains include a pair of upstream chains diverging in the downstream direction and flanking the web and respective downstream chains generally parallel to the directions. The stretch means itself in this case includes transverse stretch means constituted by the upstream chains and including edge grippers carried on the chains, constituting some of the web-engaging elements, and displaceable with the upstream chains at an angle to the downstream direction for transversely stretching the web, and longitudinal stretch means including differentially driven stretch rollers engaging the web upstream of the upstream chains, constituting the rest of the web-engaging elements, and carried on the frame adjacent the transverse stretch means for longitudinally stretching the web. Thus as the upstream stretches diverge the web engaged between them will be transversely stretched, and thereafter the stretched web will be held in stretched condition between the downstream stretches which can extend downstream past the output machine. According to this invention the stretch means includes two endless chains having upstream stretches constituting the upstream chains and downstream stretches constituting the downstream chains, the edge grippers being provided along both of the chains.

Due to the continuous nature of the stretching process and the stepwise treatment of the stretched web by the output machine, the web, which can be considered to be subdivided into a succession of sections that will be treated by the output machine sequentially, will be effectively older in the downstream portion of each such section than in the upstream portion thereof. Thus the downstream portions will have relaxed, that is will have lost more of their internal stresses, than the upstream portions. Thus the apparatus of the instant invention has upstream of the downstream location means for changing the temperature of the web. This last-mentioned means either cools the downstream portion to prevent its aging, or heats the upstream portion so it ages equally with the downstream portion. This can be done by providing this means on and displaceable with the frame, between the upstream and downstream stretches. It may also be fixed relative to the output machine.

More particularly according to this invention the means for changing includes at least one array of nozzles extending transversely across and directed at the web and means for supplying a fluid to the nozzles. Such an array of nozzles can be carried on a nozzle beam above and/or below the web. The fluid can be a gas or mist, or can simply be water. It may incorporate means such as an ultrasonic transponder for converting the water into an aerosol mist. Since the web is normally well above the boiling point of water, such water will vaporize immediately on touching the web and not leave it wet at all.

According to this invention the means for supplying the fluid includes a valve and control means connected to the valve and drive means for synchronizing the flow of the fluid with the displacement of the frame. Such control means, when used with a cool fluid, opens the valve progressively as the frame starts its stroke in the downstream direction and closes when the stroke is complete. Alternately when using a hot fluid it opens the valve completely as the frame starts its stroke in the downsteam direction and closes same progressively during such downstream stroke.

In accordance with another feature of this invention the storage means includes at least one roller support fixed adjacent the upstream location and engaging the band which passes from the roller support to the stretch rollers. When the web is particularly fragile and might stretch when hanging free, the storage means further comprises a plurality of guides engaging the web between the support roller and the stretch rollers and defining for the web a sinuous path. Such storage means includes an upstream arm having one end pivoted at the upstream location adjacent the support roller and another end, a downstream arm having one end pivoted on the frame adjacent the stretch rollers and another end, and a pivot interconnecting the other ends. The guides in this case are guide rollers carried on the arms and including a central guide roller at the pivot.

The chains according to this invention are double-roller chains having upright rollers and the grippers provided atop the chains. Means is provided for securing the edges of the web to the grippers at the upstream ends of the upstream stretches and for disengaging the edges at the downstream ends of the downstream stretches. Thus the edges of the web are secured to the grippers at the upstream ends of the upstream stretches and are disengaged at the downstream ends of the downstream stretches, after the web has left the thermoformer or other output machine.

The grippers according to this invention are points on the chains. They may be formed adjacent the points with grooves, so that the grippers have pointed heads. They may also be rods that are formed with recesses and that are flattened parallel to the chains. In this manner the edges are securely held in a very simple manner.

DESCRIPTION OF THE DRAWING

The above and other features and advantages will become more readily apparent from the following, reference being made to the accompanying drawing in which:

FIGS. 4a and 4b are side views of the apparatus according to the present invention with the frame in two different end positions;

FIG. 6 is a large-scale perspective view of a detail of the invention;

FIG. 7 is a large-scale vertical section taken along line VII—VII of FIG. 4b;

FIG. 8 is a side view illustrating a variant of the detail of FIG. 6;

FIGS. 9 and 10 are sections taken respectively along lines IX—IX and X—X of FIG. 8;

FIGS. 11a and 11b are side views of a detail of the apparatus of this invention in different operative positions;

FIG. 12 is a side view of a detail of the invention;

FIG. 12a is a section taken along XIIa—XIIa of FIG. 12;

FIG. 13 is a view similar to FIG. 12 but showing the corresponding detail with the variant of FIGS. 8-10;

FIG. 14 is another detail view of a detail of the apparatus of FIG. 12;

FIG. 15 is a view similar to that of FIG. 14 but showing the corresponding detail for the variant of FIG. 13;

SPECIFIC DESCRIPTION

Figure 1:
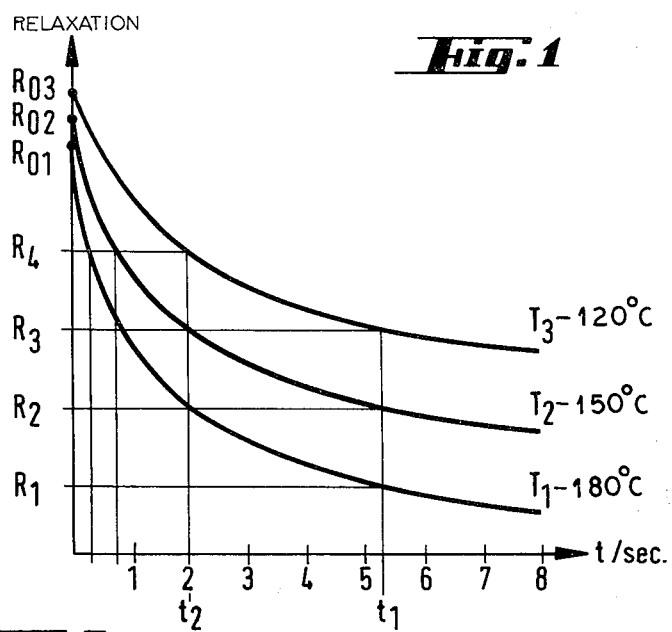
FIG. 1 is a line graph illustrating the principles behind the instant invention.

Reference is first made to the graph of FIG. 1, which shows time on its horizontal abscissa and relaxation on its vertical ordinate. The loss of internal stresses or relaxation is shown for a polystyrene web at three different temperatures, $T_1$ which is 180° C. and slightly below this resin's plastification temperature, $T_2$ which is 150° C., and $T_3$ which is 120° C., a temperature at the upper limit of the range in which the molecules of the resin can still move, that is in which orientation still possible. The relaxation is represented by the curves in FIG. 1, with the amount of relaxation, which is inversely proportional to the internal stresses in the web, decreasing toward the abscissa. It must be noted that this graph represents relaxation with respect to time in a web that is constrained against shrinking.

This graph shows that a web at relatively high temperature $T_1$ starting at $R_{01}$ loses in the first second approximately half of its internal stresses, and by $t_2$, one second later, has lost about 70% of its internal molecular orientation to have a residual internal stress of $R_2$. Of course a corresponding loss in mechanical strength can be expected. After a time $t_1$ of some 5.3 seconds the web is 85% relaxed to a residual stress of $R_1$, only possessing about 15% of its original molecular orientation.

The web at intermediate temperature $T_2$ sinks in time $t_2$ from an initial internal stress of $R_{02}$ slightly greater than $R_{01}$ to a residual internal stress of $R_3$ equal to about 65% of its original internal stress and in time $t_1$ to a residual internal stress $R_2$ of about 35% of its original internal stress.

At relatively low temperature $T_3$ the starting internal stress $R_{03}$ which is only slightly higher than $R_{02}$ drops in time $t_2$ to a level $R_4$ equal to about 80% of its original level, and in time $t_1$ drops to the level $R_3$ equal to about 65% of its original internal stressing. Thus as temperature decreases the loss of internal stresses or internal molecular orientation also decreases. Unfortunately it is not convenient or possible to perform effective stressing at low temperatures.

Figure 2:
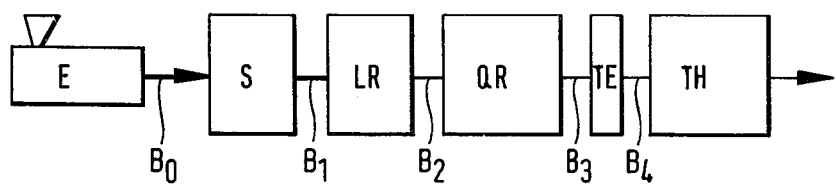
FIG. 2 is a block diagram illustrating the invention.

In a standard machine such as perhaps of the type described in U.S. Pat. No. 4,147,492 between 30 and 35 shaping operations will be performed per minute, or about one every two seconds. Thus as seen in FIG. 2 an extruder E will emit a hot web $B_0$ which is fed into a stabilizing device S in which its surfaces are cooled enough to allow the web to be handled. The thus cooled web $B_1$ then is passed through a longitudinal stretcher LR and enters a transverse stretcher QR as a web $B_2$. The biaxially stretched belt $B_3$ then enters a tempering device TE in which its temperature is equalized, and then passes as a tempered and biaxially oriented web $B_4$ into a thermoforming machine TH which turns it into a web $B_5$ of the desired shape. This represents the standard sequence of treatment steps between the extruder E and the thermoformer TH, although it is possible for some systems to eliminate the tempering stage TE.

Under the best of circumstances it has normally been considered impossible to reduce the time between the end of the transverse-stretching stage QR and the thermoforming stage TH to less than about 2 seconds. FIG. 1 shows that by this time even a web at a relatively low temperature $T_3$ has lost some 35% of its internal stresses. Such loss is tolerable. Unfortunately with a web at temperature $T_2$ the time must be reduced to 0.7 second to only lose this much internal stress, and with a web at temperature $T_1$ the time between stages QR and TH must be reduced to 0.3 seconds. Since, however, the stage TH operates at most about once every two seconds, it is impossible to reduce this interval to less than this time $t_2$. It is therefore necessary to operate within this constraint.

FIG. 1 would indicate that it would only be possible to operate with two-second cycling by using a web at temperature $T_3$ in order to avoid loss of more than 35% of the internal stresses intentionally imparted to the web by stretching to improve its mechanical strength. The problem is that polystyrene, for example, cannot be properly biaxially oriented when its temperature thus lies at the low end of its molecular-orientation range.

Figure 3A:
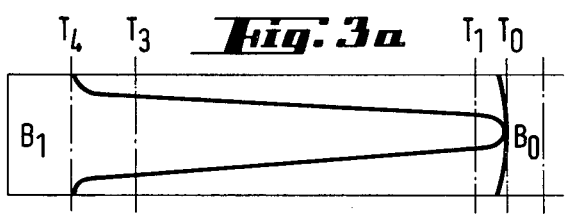
FIGS. 3a and 3b are further diagrams illustrating temperature in the web in the instant invention.
Figure 3B:
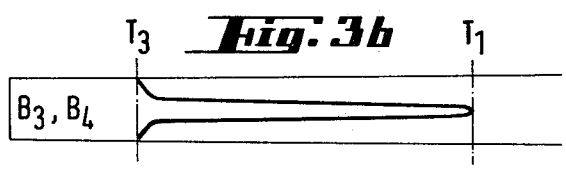

FIG. 3a indicates, however, how the web $B_0$ is extruded at its plastification temperature $T_0$ which is greater than $T_1$. As it passes through the stabilizer S to become the web $B_1$ its surface temperature drops progressively to a temperature $T_4$ which is less than the temperature $T_3$ and the temperature at which no further loss of internal stresses takes place. Meanwhile the core of the web is still at temperature $T_0$. Then as shown in FIG. 3b during stretching its thickness is reduced by the stages LR and QR, but meanwhile from inside-to-outside conduction its surface temperature rises to $T_3$ while its internal temperature drops to $T_1$ or between $T_0$ and $T_1$. In such a prior-art system, therefore, the core will be relatively unstressed while the surfaces of the web will be relatively greatly stressed, a condition which is normally accepted as it is the surface strength of the web that is considered most important.

The instant invention aims at largely eliminating any relaxation of stresses in at least the surface regions of the web. Thus according to FIGS. 4a, 4b, and 5 the web $B_{1-4}$ passes through a combined stretching and speed-changing device 20 basically comprising a stretcher-holder 21 displaceable through a stroke 26 in the transport direction and itself comprising a longitudinal stretcher 22, a transverse stretcher 23, and a holder 24 that keeps the longitudinally and transversely stretched web $B_2$ in stretched condition. A thermoformer 19 formed by an upper mold THo and a lower mold THu is engageable with the web in the holder 24. A cylinder 25 can reciprocate the device 21 through the stroke 26 which is equal to the effective length of the thermoformer 19.

Upstream of the device 21 the web $B_1$ extends as a loop in a region 27 between an upstream support roller 28 and the furthest upstream longitudinal stretching roller 29. When the device 21 is fully upstream as in FIG. 4a the web $B_1$ hangs in a relatively deep loop and when it is fully downstream as in FIG. 4b the loop is straighter.

This storage arrangement can be replaced when the web is particularly fragile by a device such as shown in FIGS. 11a and 11b which correspond roughly to the right-hand portions of FIGS. 4a and 4b. In this arrangement an upstream L-shaped arm 67 has one end pivoted on the axis of the roller 28 and another end pivoted at 68 on the end of another L-shaped arm 67 pivoted on the axis of the roller 29. These arms carry rollers 60-66, with the roller 63 at the pivot 68. The angles are such that the path length from the roller 28 to the roller 29 is the same in the furthest upstream position of the device 21 shown in FIG. 11a and in the furthest downstream position shown in FIG. 11b. In this manner even a relatively fragile web is well supported in this storage area 27.

From the roller 29 the web passes under a roller 31 and then over a roller 30. A drive motor indicated schematically at 18 in FIG. 4b is connected to the roller 29 to rotate it at the same speed as the roller 28, which is a peripheral speed equal to the speed at which the web exits from the extruder E which is not illustrated in this figure. A transmission 17 connects the roller 29 to the rollers 31 and 30, rotating the roller 31 slightly faster than the roller 29 and the roller 30 slightly faster than the roller 31. This differential action therefore longitudinally stretches the web $B_1$ into the web $B_2$.

The transverse stretcher 23 immediately downstream of the longitudinal stretcher has a pair of like roller chains 32 subdivided into a pair of upstream sections defined by a pair of angled guide rails 33 and a pair of parallel downstream sections defined by a pair of parallel guide rails 34. These chains 32 are provided with grippers 35a.

Each of these chains 32, as best seen in FIGS. 6 and 7 is a double-roller chain having an upper roller 37 gripped between guide ridges 36 of the rail 33 or 34 and a lower roller 41 gripped between further ridges 40 of the rail 33 or 34. Link plates 38 and 39 vertically embrace the upper ridges 35 and similar such plates 42 and 43 vertically flank the lower ridges 40. Bolts 44 secure the elements forming these rails 33 and 34 to a frame 45 secured to the ram 25. This use of a double-roller chain thus supported allows the chains 32 to be subjected to considerable lateral stresses.

The grippers 35a are simply pointed rods, which may be formed immediately below their points with circumferential grooves 35b as seen in FIG. 7. The edges of the web $B_2$ are engaged with these points 35a by means of a common roller 46 shown in FIGS. 4a-5, or by individual angled rolls 46a shown in FIG. 12 which have elastomeric outer portions 47 carried on rigid cores 48 and formed with circumferential grooves 49. Thus these rollers 46a press the edges of the web $B_2$ down onto the points 35a to engage it firmly therewith. At the extreme downstream end of the device 21 wedges 51 seen in FIGS. 5 and 14 raise the web edges off the points 35a to free the web $B_5$ after thermoforming.

It is also possible as seen in FIGS. 8-10 to use flat grippers 35c having flat faces extending parallel to the chain, and to form these flat grippers 35c with central transversely open and V-shaped grooves or clefts 35d. The web $B_2$ is pressed into these clefts 35d and into the spaces between adjacent grippers 35c by wheels 46b shown in FIG. 13 as having radially projecting teeth 50 spaced appropriately. Once again as shown in FIG. 15 the wedges 51 can lift the web edges from engagement with the grippers 35c.

Figure 5:
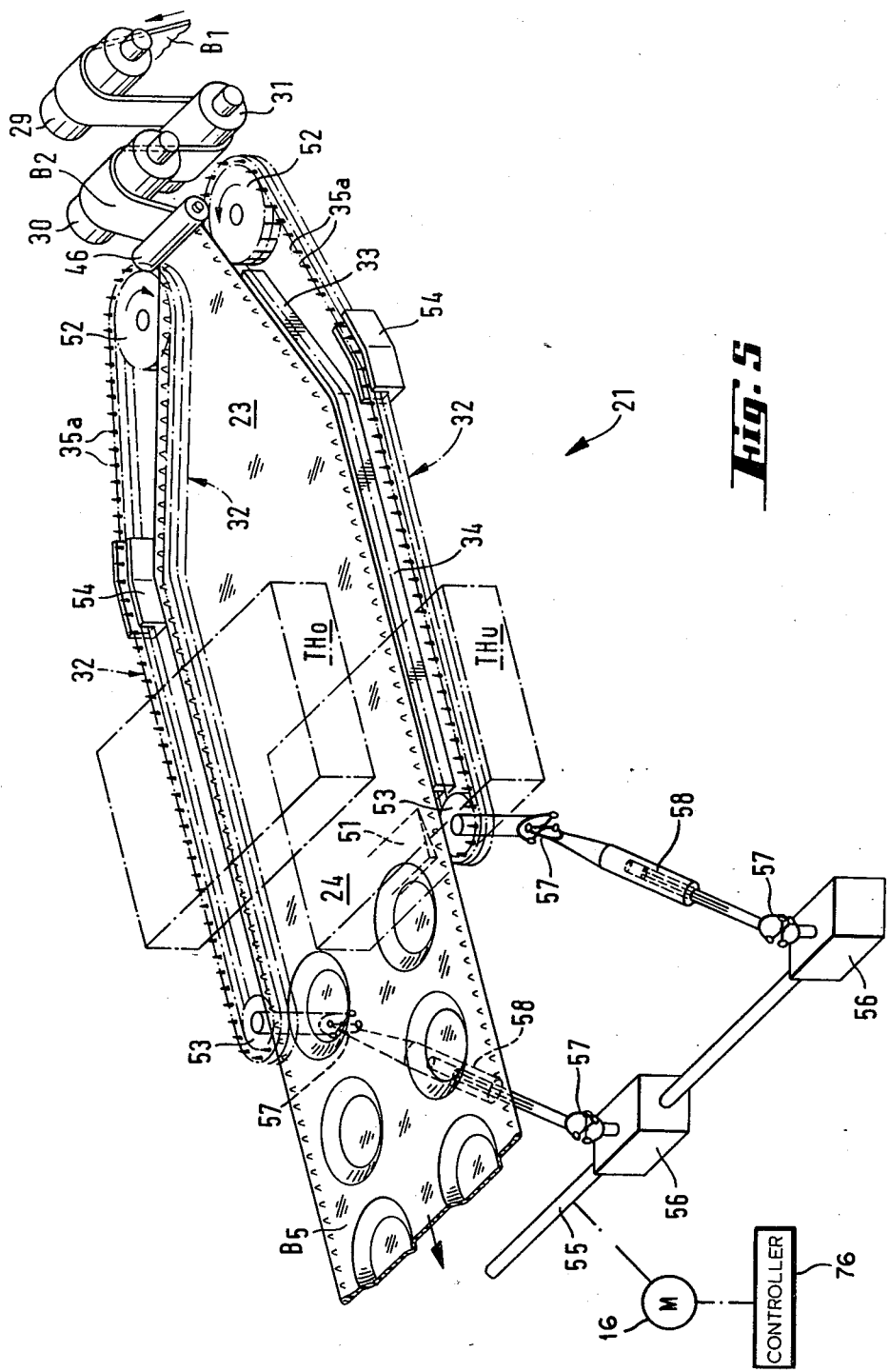
FIG. 5 is a perspective view of the apparatus of this invention.

FIG. 5 shows how the chains 32 are spanned at their upstream ends over idler sprockets 52 rotatable about vertical axes and at their downstream ends over further sprockets 53 also rotatable about vertical axes. Only the inner stretches of the chains 32 are guided in the rails 33 and 34, a simple corner guide 54 being sufficient for the outer stretches which do not carry the web.

A drive motor 16 operated by a controller 76 is connected to a drive shaft 55 connected via two right-angle drives 56 to cardan joints 57 connected in turn via telescoping shafts 58 to further universal joints 57 carried on the axles of the sprockets 53, which axles are journaled in the frame 45. These sprockets 53 are rotated at a speed to advance the chains 32 at a rate equal to the peripheral speed of the downstream longitudinal stretch roller 30, which is slightly greater than the peripheral speed of the rollers 28 and 29 and the speed at which the web exits from the extruder E.

With the system according to the instant invention running at an overall throughput speed comparable to that of standard prior-art machines such as described above, it is possible to load the web $B_3$ after transverse stretching into the thermoformer 19 within at most 2.2 seconds and at least 0.2 seconds. If a thermoformer 19 is used which is relatively short in the transport direction and which operates relatively rapidly, it is possible to operate the device with the oldest portion of the web $B_3$ in the thermoformer 19 being at most about 0.5 seconds old. Even with a large-format thermoformer 19 it is possible to form the web sooner after it is stretched than has been possible hitherto.

In the device described above, with the discontinuously acting thermoformer 19 and the continuously moving web, the downstream portion of a web section in the thermoformer is older than the upstream portion of the same web section. With some resins the difference, which as described above is some 2.0 seconds, is not important. When it is, systems such as shown in FIGS. 16-18 as well as in FIGS. 4a and 4b are employed.

Figure 16:
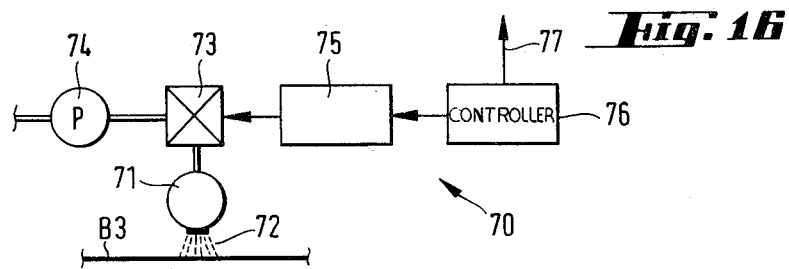
FIG. 16 is a diagrammatic view of a liquid-spraying system according to this invention.
Figure 17:
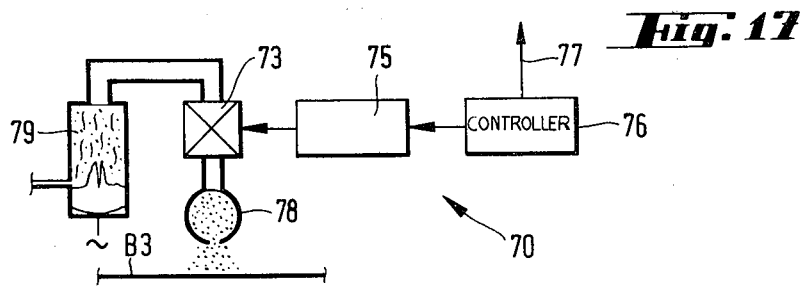
FIG. 17 is a view similar to that of FIG. 16 but showing an aerosol system according to the invention.

More particularly as shown in FIGS. 4a, 4b, and 16 a pair of nozzle beams 71 vertically flanking and extending tanvsere to the web is provided on the frame 45 immediately downstream of the transverse stretcher 23. Another such pair of nozzle beams 80 is provided at the upstream end of each thermoformer part THo and THu. Assuming that the web $B_3$ is subdivided into a longitudinal succession of sections that will each be thermoformed in a single operation of the thermoformer 19, the device is operated either to cool each section more at the downstream end than at the upstream end, thereby slowing the relaxion process at the downstream end, or to heat the upstream end to accelerate the aging process in this region. These beams 71 and 80 have nozzles 72 (FIG. 16) directed at the web $B_3$, flow to the nozzles 72 being controlled by valves 73 operated by a spray-controller 75 connected to and operated in turn by the controller 76 having lines 77 connected to the motor 18 and the actuator 25.

The valve 73 can, as shown in FIG. 16, be connected to a pump 74 to which is fed cold water or steam, depending on whether the system is used to cool or heat. Otherwise as shown in FIG. 17 it can be replaced by an aerosol boom or nozzle arrangement 78 fed from an ultrasonic mister 79 which makes a water aerosol that can be sprayed onto the web $B_3$. Since the web is normally 100° C. or above, water can cool it rapidly but, if not sprayed too heavily on the web, will be completely evaporated before the thermoformer 19 closes on it.

Figure 18:
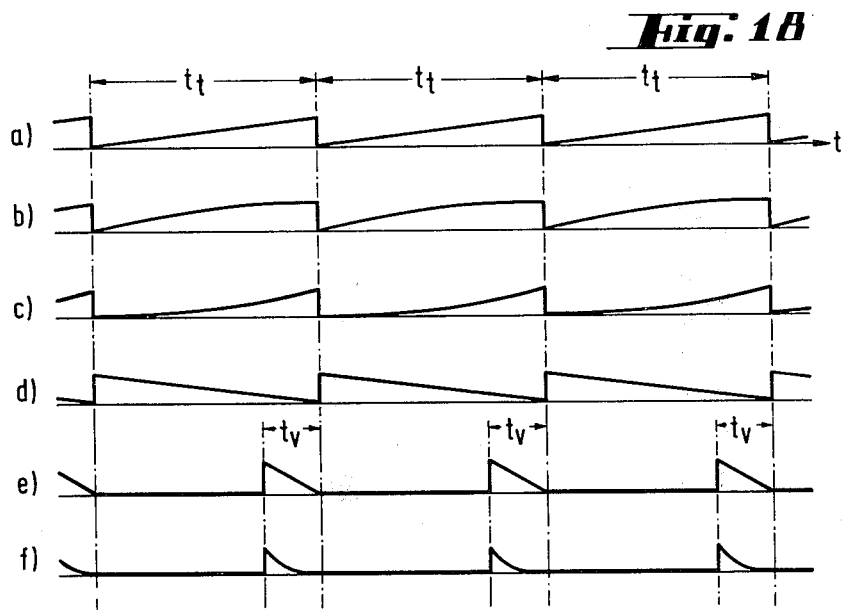
FIG. 18 is curves illustrating the method of operating the apparatus of this invention.

FIG. 18 shows various methods of operating the valves 73 with respect to time which is shown as a succession of individual times $t_t$ each corresponding to one operating cycle of the thermoformer 19. In this arrangement a heating agent is used to accelerate the aging at the upstream portion of each web section. Thus as indicated at curve (a) the valves can be opened continuously and regularly from full-closed at the start of each cycle $t_t$ to full-open at the end of each cycle $t_t$. The curve can be somewhat more asymptotic toward the rear, that is opening smoothly faster on approaching full-open as shown at (b). It is also possible to use a more logarithmic curve as shown at (c). The type of heating agent being used would determine which of curves (a)-(c) would be used.

Curve (d) of FIG. 18 is the opposite to the curve (a), that is going straight-line from fully open at the start to fully closed at the end of each cycle $t_t$. This would be used when a coolant rather than a heating agent were being employed. In addition it would be possible to combine the systems of any of curves (a)-(c) with that of curve (d), for instance by having a heating agent being sprayed by one of the nozzle beams 71 or 80 and a coolant by the other or even the upper nozzle beam 71 being used to heat and the opposite one to cool.

With the system of curve (e) the valve is opened fully about three-quarters through each cycle $t_t$ and then is shut regularly and smoothly during a time $t_v$ substantially shorter than $t_t$, going from fully open to fully closed by the end of the cycle $t_t$. The time $t_v$ corresponds to the part of the cycle during which the thermoformer 19 is open and the frame 45 is being pulled downstream through it. Such an arrangement is used with a stationary nozzle beam 80 rather than a beam 71 as is more appropriate for one of the curves (a)-(d). Thus the nozzles only spray during that brief instant when the cylinder 25 slides the frame 45 when the thermoformer 19 is open. Of course the cylinder could theoretically move the thermoformer 19 relative to the frame 45, but since this thermoformer is usually a massive and heavy item, it is easier to move the frame with the stretchers 22 and 23 relative to it. Curve (f) bears the same relationship to curve (e) as curve (c) bears to curve (a), that is the choice between curves (e) and (f) would be determined by the type of heat-transfer agent being used.

In the above discussion the workpiece is described as being of polystyrene, also known as polystyrol. This synthetic resin is normally now considered the most appropriate for thin-walled plastics articles made by thermoforming. Its modulus of elasticity can be increased by one-third by biaxially orienting, its resistance to tearing by a factor of three, and even the stretchability is somewhat increased. In addition such biaxial orienting of polystyrene makes it more resistant to attack by fats and oils, so that it is the ideal substance for the manufacture of garbage bags. The resin can be very transparent, even when oriented, and has a long plastic memory at normal ambient temperatures. The method of this invention could, however, be used with other resins, such as for example polyester, polyolefins, and polypropylenes, as all such resins do benefit from biaxial or uniaxial orientation.

In the apparatus of the instant invention the two stretchers 22 and 23 operate continuously and at the same speed all the time, even though they are carried on a frame that is reciprocated to reduce a continuously arriving input to a discontinuously leaving output. In this manner the goods are stretched uniformly. Nonetheless the downstream end of the downstream transverse stretcher 23 lies as seen in FIG. 4b immediately upstream of the thermoformer 19 in the furthest downstream position of the frame 45 just before the thermoformer closes on the web so that there is no way less time could elapse between the end of the stretching and the start of the thermoforming. Indeed, the furthest upstream portion of each section being pressed can be as little as 0.2 seconds out of the stretcher.

When a foil is being used that is up to 0.5 millimeters thick and when the web (200×9) is to be very gently tempered it is best to impart to it the temperature curve of FIGS. 3a and 3b. In this condition only the outer surfaces or skins of the film will be orientable. With a deep-drawn part, however, this is advantageous because the outer skins will have the augmented resistance to tearing and module of elasticity, but the core will still be somewhat mechanically weaker. The force the mold will have to exert will be greatly lessened, making it possible to use a less powerful mold arrangement. In addition the resin will stretch more easily, as the hot core offers little resistance to stretching, allowing lighter-duty stretchers to be employed. Meanwhile the tough outer skins will normally impart the requisite physical properties to the thermoformed product. Normally a given sheet or foil resin material, once biaxially stretched, is as strong as an unstretched sheet or foil of the same material that is some 10% to 15% thicker. Three- to five-ply laminate webs are particularly suited to the system of this invention. The thermoformed end product can be particularly good at containing water or oxygen, as it is possible to maintain sheet thickness to a tight tolerance.

The stabilizing of the extruded plastics web and the pretempering for biaxial orientation can be applied to devices with great capacity, for instance 250-kg to 700-kg machines having water coolant baths. A short tempering only is needed during which the internal core of the web heats up its outer skin so that by the time the web $B_1$ enters the storage or tempering stage 27 it is at a temperature suitable for stretching. In the water-cooling stage it is possible to vary the cooling. Since plastics are usually bad thermal conductors, it is possible in a water bath to very quickly reduce the surface temperature to below 100° C., even though the core is still much hotter.

Thus the system of the instant invention allows a web to be stretched immediately after it is extruded and then immediately thermoformed, even though some of these operations must take place continuously and others discontinuously. The tempering of the web can be varied within wide limits with the inventive system. Virtually any desired mechanical properties can be imparted to the workpiece.

I claim:

1. In combination with an input machine that continuously delivers a stretchable web to an upstream input location and with an output machine that operates stepwise to treat said web at a stationary downstream output location, a stretching apparatus comprising:
   a reciprocal support frame between said locations and displaceable in an upstream direction toward said upstream loction and a downstream direction toward said downstream location;
   stretch means carried on said frame and including web-engaging elements displaceable relative to said frame in said downstream direction for stretching said web and holding said web in stretched condition;
   storage means between said frame and said upstream location for supporting at least the upstream end of a loop of said web therebetween;
   drive means connected to said stretch means for continuously advancing the portion of said web engaged by said stretch means in said downstream direction relative to said frame at a web-travel rate; and
   displacement means connected to said frame to move same when moving in said upstream direction substantially at said web-travel rate, whereby said web stops moving at said downstream location during such upstream movement of said frame.

2. The apparatus defined in claim 1 wherein said frame is displaceable into an extreme downstream position lying at least partially downstream of said downstream location, said output machine having a predetermined length equal generally to the reciprocation stroke of said frame.

3. The apparatus defined in claim 1 wherein said stretch means includes chains extending generally in the travel direction of said web between said locations and flanking said web on said frame, said chains carrying at least some of said web-engaging elements and being connected to said drive means.

4. The apparatus defined in claim 3 wherein said chains include a pair of upstream chains diverging in said downstream direction and flanking said web and respective downstream chains generally parallel to said directions, said stretch means including:
   transverse stretch means constituted by said upstream chains and including edge grippers carried on said chains, constituting some of said web-engaging elements, and displaceable with said upstream chains at an angle to said downstream direction for transversely stretching said web; and
   longitudinal stretch means including differentially driven stretch rollers engaging said web upstream of said upstream chains, constituting the rest of said web-engaging elements, and carried on said frame adjacent said transverse stretch means for longitudinally stretching said web.

5. The apparatus defined in claim 4 wherein said stretch means includes two endless chains having upstream stretches constituting said upstream chains and downstream stretches constituting said downstream chains, said edge grippers being provided along both of said chains.

6. The apparatus defined in claim 5, further comprising upstream of said downstream location means for changing the temperature of said web.

7. The apparatus defined in claim 6 wherein said means for changing said temperature is on and displaceable with said frame.

8. The apparatus defined in claim 7 wherein said means on said frame for changing said temperature is provided between said upstream and downstream stretches.

9. The apparatus defined in claim 6 wherein said means for changing said temperature is fixed relative to said output machine.

10. The apparatus defined in claim 6 wherein said means for changing includes at least one array of nozzles extending transversely across and directed at said web and means for supplying a fluid to said nozzles.

11. The apparatus defined in claim 10 wherein said fluid is a gas.

12. The apparatus defined in claim 10 wherein said fluid is water.

13. The apparatus defined in claim 10 wherein said means for supplying said fluid includes means for making an aerosol of said water.

14. The apparatus defined in claim 10 wherein said means for supplying said fluid includes a valve and control means connected to said valve and drive means for synchronizing the flow of said fluid with the displacement of said frame.

15. The apparatus defined in claim 11 wherein said control means opens said valve progressively as said frame starts its stroke in said downstream direction and closes when the stroke is ended.

16. The apparatus defined in claim 15 wherein said control means opens said valve completely as said frame starts its stroke in said downsteam direction and closes same progressively during such downstream stroke.

17. The apparatus defined in claim 5 wherein said storage means includes at least one roller support fixed adjacent said upstream location and engaging said band, said band passing from said roller support to said stretch rollers.

18. The apparatus defined in claim 17 wherein said storage means further comprises a plurality of guides engaging said web between said support roller and said stretch rollers and defining for said web a sinuous path.

19. The apparatus defined in claim 18 wherein said storage means includes
   an upstream arm having one end pivoted at said upstream location adjacent said support roller and another end;
   a downstream arm having one end pivoted on said frame adjacent said stretch rollers and another end; and
   a pivot interconnecting said other ends, said guides being guide rollers carried on said arms and including a central guide roller at said pivot.

20. The apparatus defined in claim 5 wherein said chains are double-roller chains having upright rollers and said grippers provided atop said chains.

21. The apparatus defined in claim 20, further comprising means for securing the edges of said web to said grippers at the upstream ends of said upstream stretches and means for disengaging said edges at the downstream ends of said downstream stretches.

22. The apparatus defined in claim 5 wherein said grippers are points on said chains.

23. The apparatus defined in claim 22 wherein said grippers are formed adjacent said points with grooves, whereby said grippers have pointed heads.

24. The apparatus defined in claim 5 wherein said grippers are rods formed with recesses.

25. The apparatus defined in claim 24 wherein said rods are flattened parallel to said chains.

* * * * *